(12) United States Patent
Hepguvendik et al.

(10) Patent No.: US 10,295,060 B2
(45) Date of Patent: May 21, 2019

(54) METHOD FOR SEALING A GAP SUB ASSEMBLY

(71) Applicant: Evolution Engineering Inc., Calgary (CA)

(72) Inventors: Hasan Alper Hepguvendik, Calgary (CA); Aaron William Logan, Calgary (CA); Justin Christopher Logan, Calgary (CA); Gavin Gaw-Wae Lee, Calgary (CA); Luke Anthony Stack, Calgary (CA); Mojtaba Kazemi Miraki, Calgary (CA); Patrick Robert Derkacz, Calgary (CA); Daniel William Ahmoye, Calgary (CA)

(73) Assignee: EVOLUTION ENGINEERING INC., Calgary, Alberta (CA)

( * ) Notice: Subject to any disclaimer, the term of this patent is extended or adjusted under 35 U.S.C. 154(b) by 0 days.

(21) Appl. No.: 15/192,261

(22) Filed: Jun. 24, 2016

(65) Prior Publication Data
US 2016/0377178 A1     Dec. 29, 2016

Related U.S. Application Data

(60) Provisional application No. 62/184,510, filed on Jun. 25, 2015.

(51) Int. Cl.
| | |
|---|---|
| *F16J 15/02* | (2006.01) |
| *E21B 47/12* | (2012.01) |
| *F16J 15/06* | (2006.01) |
| *E21B 17/02* | (2006.01) |

(52) U.S. Cl.
CPC .......... *F16J 15/022* (2013.01); *E21B 17/02* (2013.01); *E21B 47/122* (2013.01); *F16J 15/061* (2013.01); *F16J 15/062* (2013.01)

(58) Field of Classification Search
CPC ........ F16J 15/062; F16J 15/061; F16J 15/022; E21B 17/028; E21B 17/02; E21B 47/122
See application file for complete search history.

(56) References Cited

U.S. PATENT DOCUMENTS

| | | | | |
|---|---|---|---|---|
| 3,797,835 | A * | 3/1974 | Wehner | E21B 33/047 277/614 |
| 3,879,097 | A * | 4/1975 | Oertle | E21B 17/028 174/47 |
| 3,933,358 | A * | 1/1976 | Hoer | F01M 11/0408 277/637 |
| 4,501,432 | A * | 2/1985 | Kuniyoshi | F16J 15/022 277/591 |
| 4,693,483 | A * | 9/1987 | Valls | F16L 17/032 277/624 |
| 4,818,209 | A * | 4/1989 | Petersson | B29C 57/025 277/314 |

(Continued)

FOREIGN PATENT DOCUMENTS

JP        09329241  A  * 12/1997  ............ F16J 15/022

*Primary Examiner* — Eugene G Byrd
(74) *Attorney, Agent, or Firm* — NK Patent Law

(57) ABSTRACT

A method for sealing a gap sub wherein injected material is used to secure a seal member in a gap. The seal member is positioned in the gap, and the material is then injected into the gap and against the seal member, seating the seal member and securing it in place once the material solidifies. The injected material is preferably electrically non-conductive.

18 Claims, 3 Drawing Sheets

(56) References Cited

U.S. PATENT DOCUMENTS

| | | | | |
|---|---|---|---|---|
| 4,834,398 | A | * | 5/1989 | Guzowski .............. F16L 17/035 277/624 |
| 5,118,119 | A | * | 6/1992 | Ditlinger ................ F16J 15/166 277/448 |
| 5,138,313 | A | * | 8/1992 | Barrington ............ E21B 17/003 175/40 |
| 5,291,842 | A | * | 3/1994 | Sallstrom ............. A01C 23/026 111/127 |
| 5,727,791 | A | * | 3/1998 | Weiss ..................... F16J 15/062 277/592 |
| 5,762,341 | A | * | 6/1998 | Wright ................... F16J 15/062 277/300 |
| 5,988,649 | A | | 11/1999 | Van Ryper et al. |
| 5,988,695 | A | * | 11/1999 | Corbett, Jr. ............. F16L 21/03 264/249 |
| 6,926,098 | B2 | | 8/2005 | Peter |
| 7,605,716 | B2 | | 10/2009 | Peter et al. |
| 7,815,225 | B2 | * | 10/2010 | Jones ................. F16L 37/0845 285/339 |
| 7,905,492 | B2 | | 3/2011 | Doane |
| 8,794,638 | B2 | | 8/2014 | Tuckness et al. |
| 2001/0033060 | A1 | * | 10/2001 | White .................... F16J 15/062 277/617 |
| 2004/0212157 | A1 | * | 10/2004 | Bohringer .............. F16J 15/062 277/645 |
| 2005/0005416 | A1 | | 1/2005 | Sather et al. |
| 2005/0242582 | A1 | * | 11/2005 | Williams ................ F16L 19/06 285/332.1 |
| 2006/0201717 | A1 | * | 9/2006 | Cramer ................. E21B 17/028 175/320 |
| 2006/0255547 | A1 | * | 11/2006 | Widder .................. F16J 15/062 277/592 |
| 2008/0110643 | A1 | * | 5/2008 | Richard ................. E21B 17/08 166/387 |
| 2008/0136122 | A1 | * | 6/2008 | Gambier ............... E21B 33/038 277/650 |
| 2010/0109249 | A1 | * | 5/2010 | Ibsen ......................... C09J 7/02 277/312 |
| 2011/0309949 | A1 | * | 12/2011 | Dopf ..................... E21B 17/003 340/854.6 |
| 2012/0049463 | A1 | * | 3/2012 | Holmes, IV ........ F16L 37/0845 277/314 |
| 2012/0228836 | A1 | * | 9/2012 | Holmes, IV ............ F16L 17/03 277/627 |
| 2013/0180733 | A1 | | 7/2013 | Bradshaw et al. |
| 2014/0124193 | A1 | | 5/2014 | Rowe et al. |
| 2014/0361496 | A1 | * | 12/2014 | Miyashita ........... F01N 13/1827 277/608 |
| 2014/0374994 | A1 | * | 12/2014 | Monteil ................ F16L 17/035 277/314 |

* cited by examiner

METHOD FOR SEALING A GAP SUB ASSEMBLY

CROSS-REFERENCE TO RELATED APPLICATIONS

This application claims priority to U.S. Provisional Patent Application No. 62/184,510 filed on Jun. 25, 2015, the entire contents of which are incorporated by reference herein.

FIELD OF THE INVENTION

The present invention relates to sealing means, and more specifically to the use of sealing means in gap subs.

BACKGROUND OF THE INVENTION

Recovering hydrocarbons from subterranean zones relies on the process of drilling wellbores. Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid usually in the form of a drilling "mud" is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; systems for telemetry of data to the surface; stabilizers; and heavy weight drill collars, pulsers and the like.

The BHA is typically advanced into the wellbore by a string of metallic tubulars (drill pipe).

Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain real time data allows for relatively more economical and more efficient drilling operations. Various techniques have been used to transmit information from a location in a bore hole to the surface. These include transmitting information by generating vibrations in fluid in the bore hole (e.g. acoustic telemetry or mud pulse telemetry) and transmitting information by way of electromagnetic signals that propagate at least in part through the earth (EM telemetry). Other telemetry systems use hardwired drill pipe or fibre optic cable to carry data to the surface.

A typical arrangement for electromagnetic telemetry uses parts of the drill string as an antenna. The drill string may be divided into two conductive sections by including an insulating joint or connector (a "gap sub") in the drill string. The gap sub is typically placed within a BHA such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. The electromagnetic signals may be detected at the surface, for example by measuring electrical potential differences between the drill string and one or more ground rods.

In gap subs, mechanical sealing devices such as gaskets are commonplace to prevent or reduce the flow or introduction of fluids into undesired locations. Gaskets, O-rings and the like are commonly employed at interfaces between components to prevent leakage of the hydrocarbon and have become ubiquitous.

However, it is known that seals can become worn or shifted by the passage of fluids over time. In cases where the fluid is being transported under pressure, this risk is increased. In many cases the seal is cylindrical in shape and in slip-fit engagement with the surfaces being sealed, and may thus be susceptible to shifting under pressure. Some prior art solutions incorporate a metallic barrier to prevent the cylindrical seal from shifting, but this introduces additional complexity and cost as well as another component that may itself become subject to wear under pressure.

What is needed, therefore, is a sealing method that can be employed to reduce the risk of a seal dislodging under fluid impingement pressure.

SUMMARY OF THE INVENTION

The present invention therefore seeks to provide a seal that comprises one or more radial extensions that engage with corresponding recesses or grooves in the surface or surfaces being sealed.

According to a first broad aspect of the present invention, there is provided a gap sub assembly comprising:
  a female tubular member comprising a female mating portion;
  a male tubular member comprising a male mating portion;
  at least a part of the male mating portion received within at least a part of the female mating portion;
  an inner surface of the female mating portion angled outwardly in an uphole direction to provide an angled female member surface, and an outer surface of the male mating portion generally cylindrical to provide a non-angled male member surface, providing a wedge-shaped gap between the angled female member surface and the non-angled male member surface;
  a seal member having a wedge-shaped cross-section positioned within the gap and sealingly engaging both the angled female member surface and the non-angled male member surface; and
  an injected material retaining the seal member in the gap and sealingly engaging both the angled female member surface and the non-angled male member surface.

According to a second broad aspect of the present invention, there is provided a gap sub for insertion in a drill string, the gap sub comprising:
  a female tubular member comprising a female mating portion;
  a male tubular member comprising a male mating portion;

at least a part of the male mating portion received within at least a part of the female mating portion;

an inner surface of the female mating portion angled outwardly in an uphole direction to provide an angled female member surface, and an outer surface of the male mating portion cylindrical to provide a non-angled male member surface, providing a wedge-shaped gap between the angled female member surface and the non-angled male member surface;

a seal member having a wedge-shaped cross-section positioned within the gap and sealingly engaging both the angled female member surface and the non-angled male member surface; and an injected material retaining the seal member in the gap and sealingly engaging both the angled female member surface and the non-angled male member surface.

According to a third broad aspect of the present invention, there is provided a method for sealing a gap sub, the gap sub comprising a female tubular member having an outwardly angled inner surface and a mated male tubular member having a non-angled outer surface facing the outwardly angled inner surface, providing a wedge-shaped gap between the angled inner surface and the non-angled outer surface;

the method comprising the steps of:
a. providing a seal member having a wedge-shaped cross-section corresponding to the gap and configured to sealingly engage both the angled inner surface and the non-angled outer surface;
b. inserting the seal member into the gap;
c. injecting a material into the gap against an upper impingement surface of the seal member, thereby pressing down on the seal member to seat the seal member in the gap; and
d. allowing the material to solidify, thereby securing the seal member in the gap such that the seal member sealingly engages both the angled inner surface and the non-angled outer surface.

According to a fourth broad aspect of the present invention, there is provided a method for securing a gap sub seal, the method comprising the steps of:
a. providing a gap sub comprising a female tubular member having an outwardly angled inner surface and a mated male tubular member having a non-angled outer surface facing the outwardly angled inner surface, providing a wedge-shaped gap between the angled inner surface and the non-angled outer surface;
b. providing a seal member having a wedge-shaped cross-section corresponding to the gap and configured to sealingly engage both the angled inner surface and the non-angled outer surface;
c. inserting the seal member into the gap;
d. injecting a material into the gap against an upper impingement surface of the seal member, thereby pressing down on the seal member to seat the seal member in the gap; and
e. allowing the material to solidify, thereby securing the seal member in the gap such that the seal member sealingly engages both the angled inner surface and the non-angled outer surface.

In some exemplary embodiments of the present invention, the gap is wedge-shaped at only an upper portion, and the seal member is sized and configured to seal at least the upper portion of the gap. The gap may comprise a lower cylindrical portion, such that the seal member is sized and configured to seal both the upper portion and the lower portion of the gap, and in some cases at least one O-ring is provided for sealing a lower end of the seal member in the lower portion of the gap.

The sealing engagement is preferably selected from the group consisting of size-on-size and press fit. The seal member itself may be composed of an electrically non-conductive material, such as for example polyether ether ketone. The injected material may also be an electrically non-conductive material, such as a plastic.

In some exemplary embodiments, a jamming ring is provided to help secure the seal member in place. The jamming ring would be sized and configured to press downwardly against a portion of the seal member to further secure the seal member in place within the gap.

By angling the inwardly-facing surface of the female tubular, a wedge-shaped seal member can be forced against the opposed surfaces and held in place by the injected material already commonly employed in some gap sub designs.

A detailed description of an exemplary embodiment of the present invention is given in the following. It is to be understood, however, that the invention is not to be construed as being limited to this embodiment. The exemplary embodiment is directed to particular applications of the present invention, while it will be clear to those skilled in the art that the present invention has applicability beyond the exemplary embodiment set forth herein.

BRIEF DESCRIPTION OF THE DRAWINGS

In the accompanying drawings, which illustrate an exemplary embodiment of the present invention.

An exemplary embodiment of the present invention will now be described with reference to the accompanying drawings.

DETAILED DESCRIPTION OF EXEMPLARY EMBODIMENT

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the invention to the precise forms of any exemplary embodiment. Accordingly, the description and drawings are to be regarded in an illustrative, rather than a restrictive, sense.

Figure 1:
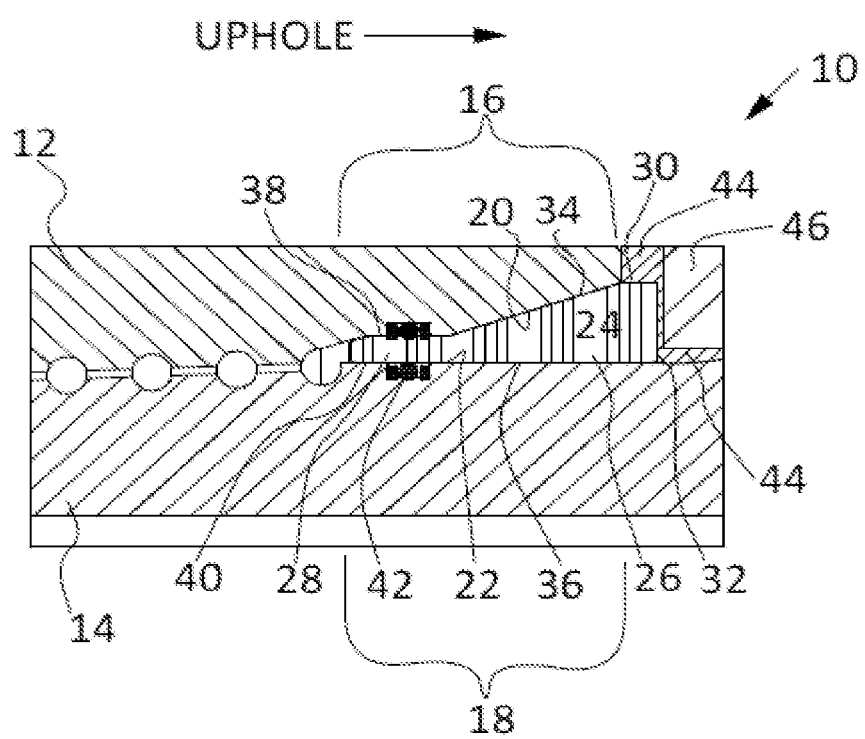
FIG. 1 is a sectional view of an exemplary embodiment of the present invention, with the seal member secured in place between the female member and the male member.

Turning to FIG. 1, an exemplary gap sub assembly 10 is illustrated. The gap sub assembly 10 comprises a mated female tubular member 12 and male tubular member 14. As can be seen in FIG. 1, the female member 12 has a mating portion 16 that comprises an inner surface 20, and the male member 14 has a mating portion 18 that comprises an outer surface 22, the inner surface 20 and the outer surface 22 generally facing each other. The inner surface 20, however, is angled outwardly away from the outer surface 22, in an uphole direction. In conventional gap sub assemblies, in contrast, it is common to have the opposed surfaces parallel, thus the gap therebetween is consistent in thickness from one end to the other. In the present invention, the angled inner surface 20 creates a gap that expands in an uphole direction.

A seal member 24 is inserted into the gap. The seal member 24 is shown in detail in FIGS. 2 and 3, and is preferably composed of an electrically non-conductive material, and most preferably polyether ether ketone. The seal member 24 comprises an upper portion 26 and a lower portion 28, the upper portion 26 for sealingly engaging the angled inner surface 20 with an outer seal member surface 34 and sealingly engaging the non-angled outer surface 22 with an inner seal member surface 36, preferably in a size-on-size or press-fit engagement. As can be seen in FIG. 1, the female mating portion 16 also includes a downhole non-angled section, such that the lower portion 28 is more conventionally cylindrical and sealingly engages the inner surface 20 with an outer seal member surface 38 and sealingly engages the outer surface 22 with an inner seal member surface 40. The lower portion 28 is more conventionally cylindrical, and is for sealing the parallel opposed tubular surfaces in that part of the assembly 10.

In the exemplary embodiment, the lower portion 28 is further secured by O-rings 42, as a measure to further ensure adequate sealing.

Figure 2:
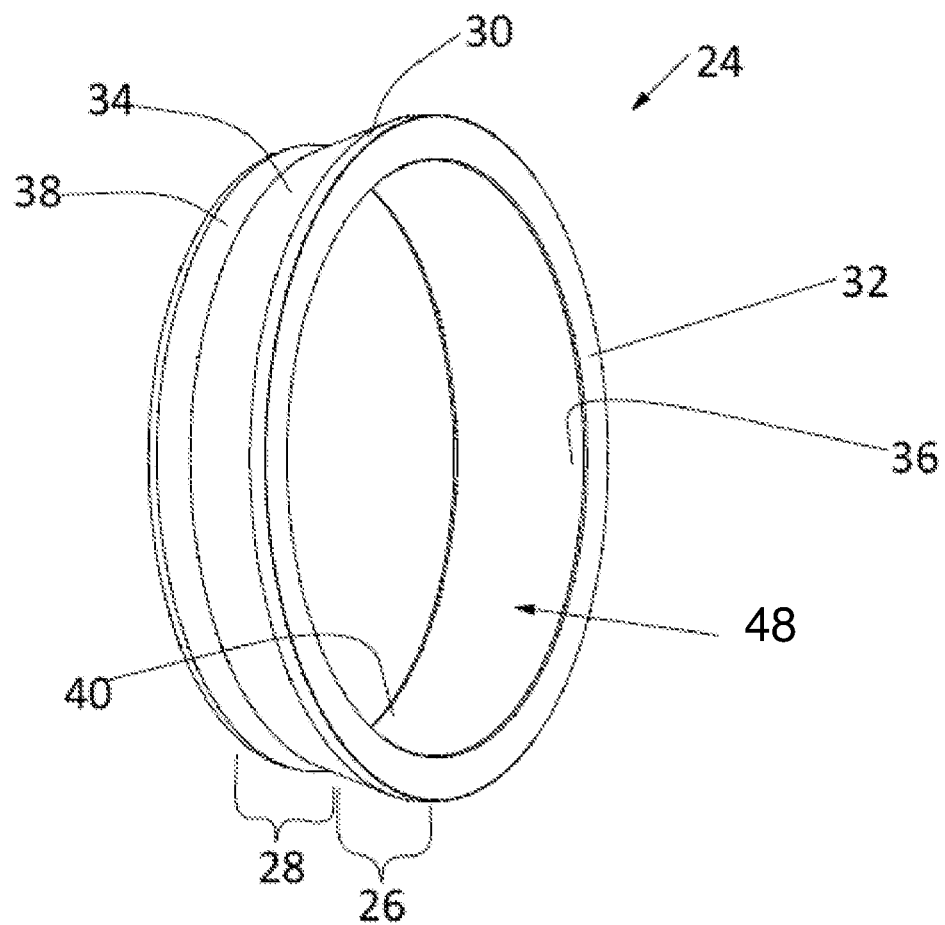
FIG. 2 is a perspective view of a seal member in accordance with the exemplary embodiment.
Figure 3:
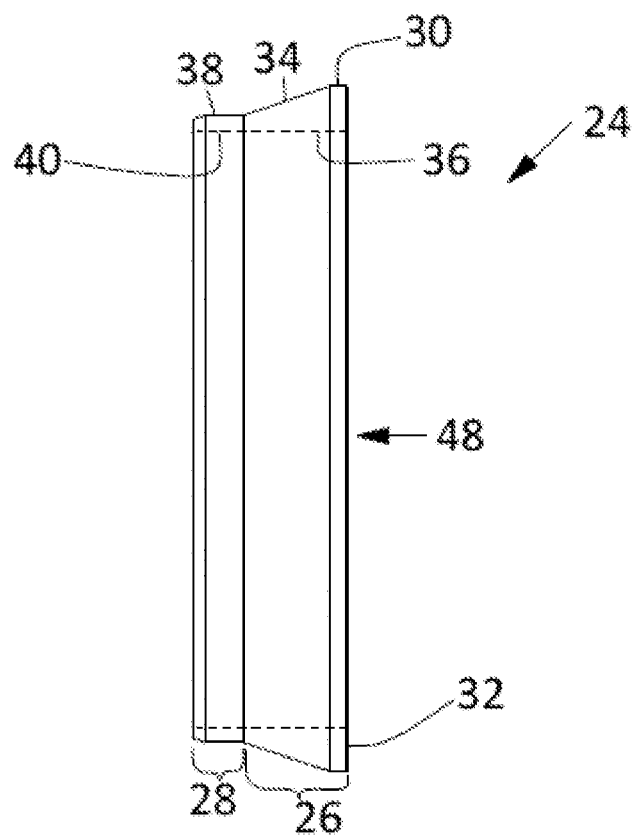
FIG. 3 is an elevation view of the seal member in accordance with the exemplary embodiment.

FIG. 1 only illustrates a part of the gap sub assembly 10, namely a sectional view of what is a generally cylindrical assembly. The male member 14 is generally cylindrical and would be positioned within a cavity 48, which cavity 48 is shown in FIGS. 2 and 3.

The seal member 24 further comprises surfaces that do not sealingly engage the female and male members 12, 14. Specifically, when seated as shown in FIG. 1, the seal member 24 comprises an exposed side surface 30 and an exposed top surface 32. These exposed surfaces 30, 32 could be subjected to downhole fluid impingement unless engaged in some manner. In the exemplary embodiment, a jamming ring 46 is pressed against a portion of the exposed top surface 32, in a conventional manner such as threading, thereby pressing downwardly against the seal member 24 to secure the seal member 24 in place against the opposed surfaces 20, 22.

In addition, it is known to inject an electrically insulative material such as a plastic into certain areas of a gap sub to assist in the necessary electrical isolation required for utility of the gap sub in telemetry operations. In the exemplary embodiment of the present invention, an electrically non-conductive material 44 is injected for this purpose but also to further secure the seal member 24 against the opposed surfaces 20, 22. The material 44 is shown as injected against the exposed surfaces 30, 32, but it could also be injected into void spaces downhole of the lower portion 28.

In operation, then, female and male members 12, 14 would be provided, with the female member 12 having an angled surface 20 as described above and illustrated herein. The seal member 24—manufactured to the correct size and shape for the desired engagement—would be inserted either over the male member 14 before mating with the female member 12 or after mating of the female and male members 12, 14, depending on other structural features of the particular gap sub. O-rings 42 would also be applied at this same time. With the seal member 24 (and O-rings 42) in place between the female and male members 12, 14, the jamming ring 46 would be installed and pressed/threaded against the top surface 32 of the seal member 24. Following this, the material 44 would be injected against the side and top exposed surfaces 30, 32 of the seal member 24, and subsequently allowed to solidify. Once solidified, the now-hardened material 44 would provide further security to the seal of the gap sub assembly 10.

Even if the material 44 and jamming ring 46 were to loosen and allow downhole fluid to impinge upon the seal member 24, the surfaces 34, 36 of the seal member 24 would be pressed against the inner and outer surfaces 20, 22 by the fluid pressure, thus reducing the risk of fluid incursion around the seal member 24.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiment set forth in the foregoing, but should be given the broadest interpretation consistent with the specification as a whole.

What is claimed is:

1. A gap sub assembly comprising:
   a female tubular member comprising a female mating portion;
   a male tubular member comprising a male mating portion;
   at least a part of the male mating portion received within at least a part of the female mating portion;
   an inner surface of the female mating portion angled outwardly in an uphole direction to provide an angled female member surface, and an outer surface of the male mating portion generally cylindrical to provide a non-angled male member surface, providing a wedge-shaped gap between the angled female member surface and the non-angled male member surface;
   a seal member having a wedge-shaped cross-section positioned within the gap and sealingly engaging both the angled female member surface and the non-angled male member surface; and
   an electrically non-conductive injected material injected against exposed surfaces of the seal member for retaining the seal member in the gap and electrically isolating the male tubular member and the female tubular member, the electrically non-conductive injected material contacting an exposed top surface and an exposed side surface of the seal member.

2. The gap sub assembly of claim 1 wherein the gap is wedge-shaped at only an upper portion, and the seal member is sized and configured to seal at least the upper portion of the gap.

3. The gap sub assembly of claim 2 wherein the gap comprises a lower cylindrical portion, the seal member sized and configured to seal both the upper portion and the lower portion of the gap.

4. The gap sub assembly of claim 1 wherein the seal member is composed of an electrically non-conductive material.

5. The gap sub assembly of claim 4 wherein the electrically non-conductive material is polyether ether ketone.

6. The gap sub assembly of claim 1 wherein the electrically non-conductive injected material is a plastic.

7. A gap sub for insertion in a drill string, the gap sub comprising:
   a female tubular member comprising a female mating portion;
   a male tubular member comprising a male mating portion;
   at least a part of the male mating portion received within at least a part of the female mating portion;
   an inner surface of the female mating portion angled outwardly in an uphole direction to provide an angled female member surface, and an outer surface of the male mating portion cylindrical to provide a non-angled male member surface, providing a wedge-shaped gap between the angled female member surface and the non-angled male member surface;
   a seal member having a wedge-shaped cross-section positioned within the gap and sealingly engaging both the angled female member surface and the non-angled male member surface; and
   an electrically non-conductive injected material injected against exposed surfaces of the seal member for retaining the seal member in the gap and electrically isolating the male tubular member and the female tubular member, the electrically non-conductive injected material contacting an exposed top surface and an exposed side surface of the seal member.

8. The gap sub of claim 7 wherein the gap is wedge-shaped at only an upper portion, and the seal member is sized and configured to seal at least the upper portion of the gap.

9. The gap sub of claim 8 wherein the gap comprises a lower cylindrical portion, the seal member sized and configured to seal both the upper portion and the lower portion of the gap.

10. The gap sub of claim 7 wherein the seal member is composed of an electrically non-conductive material.

11. The gap sub of claim 10 wherein the electrically non-conductive material is polyether ether ketone.

12. The gap sub of claim 7 wherein the electrically non-conductive injected material is a plastic.

13. A method for sealing a gap sub, the gap sub comprising a female tubular member having an outwardly angled inner surface and a mated male tubular member having a non-angled outer surface facing the outwardly angled inner surface, providing a wedge-shaped gap between the angled inner surface and the non-angled outer surface;
   the method comprising the steps of:
   a. providing a seal member having a wedge-shaped cross-section corresponding to the gap and configured to sealingly engage both the angled inner surface and the non-angled outer surface;
   b. inserting the seal member into the gap;
   c. injecting an electrically non-conductive injectable material into the gap against a top and a side impingement surface of the seal member, thereby pressing down on the seal member to seat the seal member in the gap and electrically isolating the male tubular member and the female tubular member from each other; and
   d. allowing the injectable material to solidify, thereby securing the seal member in the gap such that the seal member sealingly engages both the angled inner surface and the non-angled outer surface.

14. The method of claim 13 wherein the gap is wedge-shaped at only an upper portion, and the seal member is sized and configured to seal at least the upper portion of the gap.

15. The method of claim 14 wherein the gap comprises a lower cylindrical portion, the seal member sized and configured to seal both the upper portion and the lower portion of the gap.

16. The method of claim 13 wherein the seal member is composed of an electrically non-conductive material.

17. The method of claim 16 wherein the electrically non-conductive material is polyether ether ketone.

18. The method of claim 13 wherein the electrically non-conductive injectable material is a plastic.

* * * * *